Sept. 4, 1951  P. C. LIVESAY  2,566,343
POSITIVE SHUTOFF DEVICE
Filed July 3, 1944
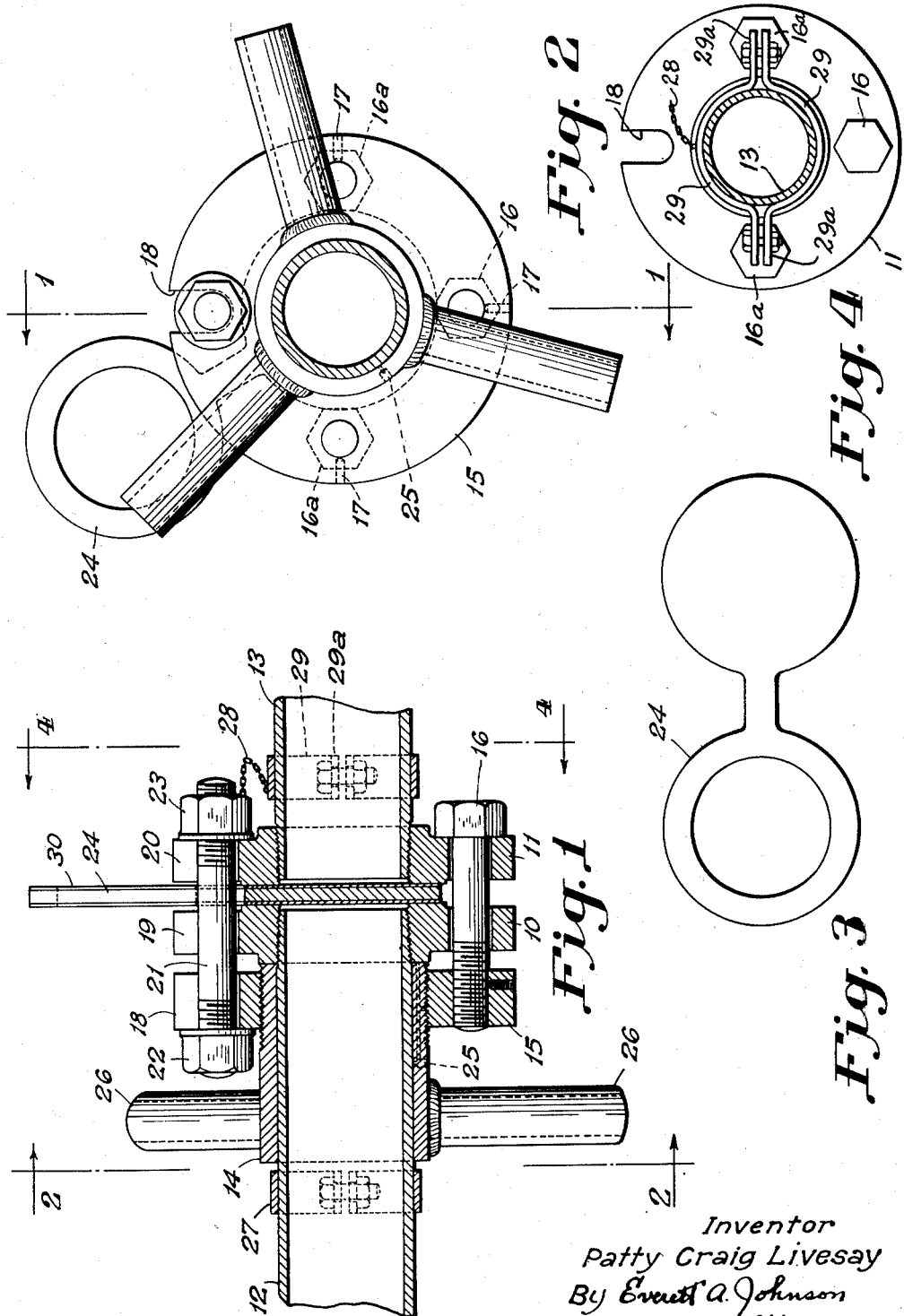
Inventor
Patty Craig Livesay
By Everett A. Johnson
Attorney Patented Sept. 4, 1951

2,566,343

UNITED STATES PATENT OFFICE 2,566,343

POSITIVE SHUTOFF DEVICE

Patty Craig Livesay, Hammond, Ind., assignor to Standard Oil Company, Chicago, Ill., a corporation of Indiana Application July 3, 1944, Serial No. 543,277

7 Claims. (Cl. 251—167)

This invention relates to a special type of flow control and coupling apparatus employed where it is desired to effect a temporary but positive shutoff of a given conduit.

In various refinery operations it may become necessary to block completely a transfer line for a given time and for this service a gate or plug valve is not satisfactory, experience having taught that valves of this type do not provide a really positive shutoff. Various elaborate mechanisms have been proposed for effecting such a cutoff, but in general, these devices are expensive and cumbersome. One method of effecting the cutoff is to separate the pipe flanges by unbolting, inserting a blind between them, and rebolting. This latter expedient requires the use of wrenches to remove studs and may require the services of a pipefitter.

Therefore, it is an object of my invention to provide a simple and foolproof apparatus for effecting a positive cutoff in a transfer line. It is a further object to provide a heavy duty apparatus having a minimum of moving parts. Another object is to provide a mechanism which can be operated without the use of wrenches or mechanics' tools and with a minimum amount of effort. These and other objects will become apparent as the description of my invention proceeds with reference to the drawings wherein Figure 1 is a side view of the assembly, partly in section, taken along the line 1—1 of Figure 2;

Figure 2 is an end view of the mechanism in an operating position;

Figure 3 is a detail of the figure 8 blind; and

Figure 4 is a fragmentary view along line 4—4 in Figure 1 and illustrates the cooperation of the stop means with the draw members.

The device consists essentially of an auxiliary mechanism for separating a pair of pipe flanges to permit the insertion of a flow control means without using a wrench or disturbing the bolting. In a preferred embodiment a figure 8 blind furnishes the means of changing from a flowing condition to a positive shutoff condition.

With particular reference to the drawings, flanges 10 and 11 are threaded or fixed by some other means to the ends of pipes 12 and 13. A threaded sleeve 14 is provided about the pipe 12 behind the near flange 10 and an annular plate 15 is threaded onto the sleeve 14. Flange stud bolts 16 and 16a are run through the flanges 10 and 11 and engage the plate 15. When the bolts are threaded into the plate 15, set screws 17 can be provided to retain them. The flanges 10 and 11 and plate 15 have slots 18, 19, and 20 in which the latch means 21 is secured. In the drawings the latch means comprises bolt 21 and nuts 22—23. When the tension is removed from the bolt 21, the latch can be removed easily to permit the manipulation of the figure 8 blind 24 without the use of tools. The nuts 22 and 23 can be tack welded on bolt 21 in the desired position, and the latch assembly can be fixed by a light chain 28 to pipe clamp 29 to prevent its loss. In some instances, it will be advantageous to provide the shank of the figure 8 blind 24 with a slot for the bolt 21. Inasmuch as bolt 21 can be lifted from the apparatus, the figure 8 blind can be pivoted about the bolt 21 and then both elements replaced as a unit. A grease fitting 25 has been provided through plate 15 and sleeve 14 so that these elements can be kept greased and in good working order.

The sleeve 14, which is threaded into the plate 15 can be rotated manually with the aid of elements 26 and since the sleeve is threaded it has a tendency to move toward the flange 10 and urges the plate 15 away from the flanges 10 and 11. This places tension in the stud bolts 16 and 21 which pull the flange 11 toward flange 10, flange 10 opposing the longitudinal movement of sleeve 14. This action causes the flanges 10 and 11 to be moved toward each other and to clamp securely the figure 8 blind 24 between them. The figure 8 blind 24 can be provided with suitable gasket surfaces 30 to effect a leakproof seal.

When the direction of rotation of the sleeve 14 is reversed, the sleeve tends to move away from the flanges 10 and 11 but is prevented from doing so by the stop 27 illustrated as a clamp about the pipe 12. The plate 15 then tends to force stud bolts 16 and 16a back through the flanges 10 and 11. The wings 29a of the clamp 29 oppose the movement of 16 and 16a. It is contemplated, however, that equivalent means such as a spider about conduit 13 between the flange 11 and clamp 29 can be provided. In any event by exerting forces in opposite directions to the stop means 27 and 29, the flanges 10 and 11 are forced apart.

When the flanges 10 and 11 separate, the ends of the figure 8 blind 24 can be reversed very quickly and with little effort. If desired two separate elements, one a disc and the other an annulus can be used in place of the figure 8 blind. The figure 8 blind 24 has the advantage of providing a visual indication as to whether or not the pipe is flowing or is shutoff.

Although my invention has been described with reference to particular embodiments thereof, it should be understood that modifications and alterations can be made therein without departing from the scope of my invention. The apparatus described in more or less detail is for the purpose of illustration only, and it is intended that the scope of the invention is defined by the appended claims.

I claim:

1. An improvement in disc valves comprising in combination a pair of opposed conduits having adjacent flanges, a disc interposable therebetween, and means for securing the flanges in tight relation with the disc following interposition of the disc and for relatively spreading the adjacent conduit ends for interchange of discs, said means including an externally threaded sleeve mounted on one of said conduits, an annular plate threaded on said sleeve, a plurality of rigid draw members rigidly connected to said annular plate and adapted to slidably engage the flange on the other of said conduits in a manner limiting maximum separation of said annular plate and said flange as well as relative rotation thereof, stop means on each of said conduits, one positioned to engage said sleeve and the other to engage at least one of said rigid draw members, and a latch means slidably carried in radially extending slots in said annular plate and said flanges, said latch means being removable therefrom when said conduits are parted.

2. A positive shutoff device adapted for temporarily blocking a line comprising first and second conduits, a flange on each of the adjacent ends of said conduits, a flow control member adapted to be disposed between said flanges, a sleeve about the first of said conduits, an annular plate threaded to said sleeve, radially extending arms affixed to said sleeve, a plurality of tapped holes in said annular plate and a plurality of drilled holes in said flanges registering with said tapped holes, a radial slot in each of said flanges and said plate, said slots being in substantially longitudinal alignment, a removable latch means carried in said slots, bolts slidably disposed within the holes in said flanges with the heads abutting the remote surface of the flange on the second conduit and the shanks threading into said plate whereby said bolts are normally in tension, a first thrust means fixed to said first conduit, and a second thrust means fixed to said second conduit, said first and second thrust means co-acting with said sleeve and with said bolts, respectively to place said bolts in compression and to part said flanges.

3. An apparatus for temporarily blocking a conduit comprising a pair of flanges on adjacent ends of first and second conduits, a movable sleeve about the first of said conduits adjacent one of said flanges, arm means fixed to said sleeve adapted for applying torque to said sleeve, an annular plate threaded to said sleeve, bolt means passing through said flanges and threaded into said annular plate, an additional bolt means comprising a removable latch carried in radial slots, said latch being removable without disturbing the remaining bolt means threaded into said annular plate, stop means associated with the first of said conduits for limiting the longitudinal movement of said sleeve away from the flange on said first conduit, and second stop means associated with the second of said conduits for limiting the longitudinal movement of said bolt means with reference to the flange on said second conduit, whereby the flanges are urged toward each other when said plate is drawn away from said flanges by rotating said sleeve and the said stop means coact with the bolt means to cause the flanges to move away from each other.

4. A positive shutoff device for conduits comprising a first and second conduit, flanges on said conduits, a removable flow control member adapted to be secured between said flanges, a movable sleeve about one portion of said first conduit, an annular plate threaded to said sleeve, rigid draw means extending through said flanges, one end of said draw means threading into said annular plate and the other end having shoulder means for abutting the remote surface of the flange of the second conduit, a radial open slot at the periphery of each of said flanges and said plate, said slots being in substantially longitudinal alignment with reference to said conduits, an independently removable latch member carried in said slots, means for limiting the longitudinal movement of said sleeve along said first conduit, and means carried by said second conduit adapted to co-act with said draw means for opposing the longitudinal displacement of said plate with reference to said second conduit.

5. A coupling device for a pair of flanged conduits comprising a movable sleeve adjacent the flange of a first conduit, an annular plate threaded to said sleeve, a removable flow control member between said flanges, a plurality of rigid draw means passing through said flanges and longitudinally movable therethrough, said draw means fixedly terminating in said annular plate and having a shoulder means for movably abutting the remote surface of the flange of the second conduit whereby said plate and flanges are not rotatable in respect of each other, radially extending arm means carried by said sleeve for rotating said sleeve whereby said annular plate being threaded to said sleeve is moved longitudinally of said conduit, stop means associated with said first conduit adapted to limit the longitudinal movement of said sleeve away from the flange carried by said first conduit, and a second stop means carried by said second conduit adapted to co-act with at least one of said draw means to oppose the longitudinal movement of said annular plate toward said second conduit.

6. A positive shutoff device for conduits comprising in combination a first and second conduit having flanges on adjacent ends thereof, a rotatable sleeve carried by said first conduit adjacent the flange thereon, substantially radially extending arm means fixed to said sleeve, means on said first conduit for limiting the longitudinal movement of said sleeve, an annular plate threaded on said sleeve, a plurality of rigid draw means threaded into said plate slidably passing through said flanges, each of said draw means having at its free end an abutment engaging the flange of the second conduit, a flow control means adapted to be secured between said flanges when said draw means are in tension, a radial slot in each of said flanges and plate in substantial longitudinal alignment, a removable latch member carried in said aligned slots, and means on said second conduit adapted to oppose the longitudinal movement of the free ends of the draw means through the flange on said second conduit.

7. A positive shutoff device for conduits comprising a combination of opposed first and second conduits, a flange on each of the adjacent ends of said conduits, said flanges having a plurality of symmetrically arranged holes and a radial slot through the periphery, the symmetrically arranged holes and slots of said flanges being in substantial axial alignment, a rotatable sleeve carried by said first conduit adjacent the flange thereof, an annular plate threaded on said sleeve having tapped openings and a slot in alignment with the corresponding openings and slot in the flanges, initially adjustable rigid draw means threaded into the said tapped openings in the annular plate, set-screw means in said plate adapted to lock said threaded draw means in position, an adjustable latch means carried in said radial slots, said latch means having spaced shoulder means adapted to engage the remote surface of said plate and the flange on said second conduit adapted to be placed in tension and limit the maximum separation and relative rotation of the flanges and annular plate, a stop means carried by the second conduit and displaced from the flange on said second conduit, said stop means being adapted to take the thrust of the draw means when in compression, a flexible anchor means fixed to said stop means and said latch means, and a removable flow control element disposed between said flanges.

PATTY CRAIG LIVESAY.

REFERENCES CITED

The following references are of record in the file of this patent:

UNITED STATES PATENTS

| Number | Name | Date |
| --- | --- | --- |
| 2,339,970 | Young | Jan. 25, 1944 |
| 2,340,499 | Zachow | Feb. 1, 1944 |
| 2,386,893 | Hamer | Oct. 16, 1945 |